(12) United States Patent
Reitberger

(10) Patent No.: US 7,210,365 B2
(45) Date of Patent: May 1, 2007

(54) GUIDE SECTION WITH TOOTHED RACK

(75) Inventor: Rudolf Reitberger, Munich (DE)

(73) Assignee: Hilti Aktiengesellschaft, Schann (LI)

( * ) Notice: Subject to any disclaimer, the term of this patent is extended or adjusted under 35 U.S.C. 154(b) by 372 days.

(21) Appl. No.: 10/766,241

(22) Filed: Jan. 27, 2004

(65) Prior Publication Data

US 2004/0255709 A1    Dec. 23, 2004

(30) Foreign Application Priority Data

Jan. 27, 2003   (DE) .............................. 103 03 007

(51) Int. Cl.
*F16H 27/02*   (2006.01)

(52) U.S. Cl. ..................... 74/89.17; 74/89.11; 74/422; 384/55

(58) Field of Classification Search ................ 403/252, 403/255, 331, 387, 391, 401, 381, 109.1, 403/109.2, 109.6; 74/89.11, 89.17, 422; 384/7

See application file for complete search history.

(56) References Cited

U.S. PATENT DOCUMENTS

| 3,338,140 | A | * | 8/1967 | Sheesley | ...................... 92/5 R |
|---|---|---|---|---|---|
| 3,888,340 | A | * | 6/1975 | Hoffman | ...................... 400/611 |
| 4,355,778 | A | * | 10/1982 | Hess et al. | ................... 248/429 |
| 5,058,446 | A | * | 10/1991 | Guey | ......................... 74/89.17 |
| 5,324,118 | A | * | 6/1994 | Ichida | ........................... 384/44 |
| 5,549,390 | A | * | 8/1996 | Reitberger | .................... 384/44 |
| 5,845,996 | A | | 12/1998 | Greubel et al. | |
| 6,472,778 | B2 | * | 10/2002 | Keller | .......................... 310/12 |
| 6,561,056 | B2 | * | 5/2003 | Maffeis | ................... 74/490.01 |
| 7,055,624 | B2 | * | 6/2006 | Reitberger | .................... 175/20 |

FOREIGN PATENT DOCUMENTS

| DE | 4326194 | 5/1999 |
|---|---|---|
| DE | 9749625 | 5/1999 |

* cited by examiner

*Primary Examiner*—Richard Ridley
*Assistant Examiner*—Matthew A. Johnson
(74) *Attorney, Agent, or Firm*—Abelman, Frayne & Schwab

(57) ABSTRACT

A guide section (1) for guiding a slide for a power tool along a longitudinal axis (A) with a separate axial toothed rack (3) for longitudinal advance of the slide having the toothed rack (3) arranged in an outwardly open receiving groove (4), with outwardly oriented toothing (5). The toothed rack (3) in cross-section forms at least two opposing sides (6a, 6b) laterally undercut relative to the toothing, in which the groove edges (7) of the receiving groove (4) are at least partially inserted and secured.

4 Claims, 2 Drawing Sheets

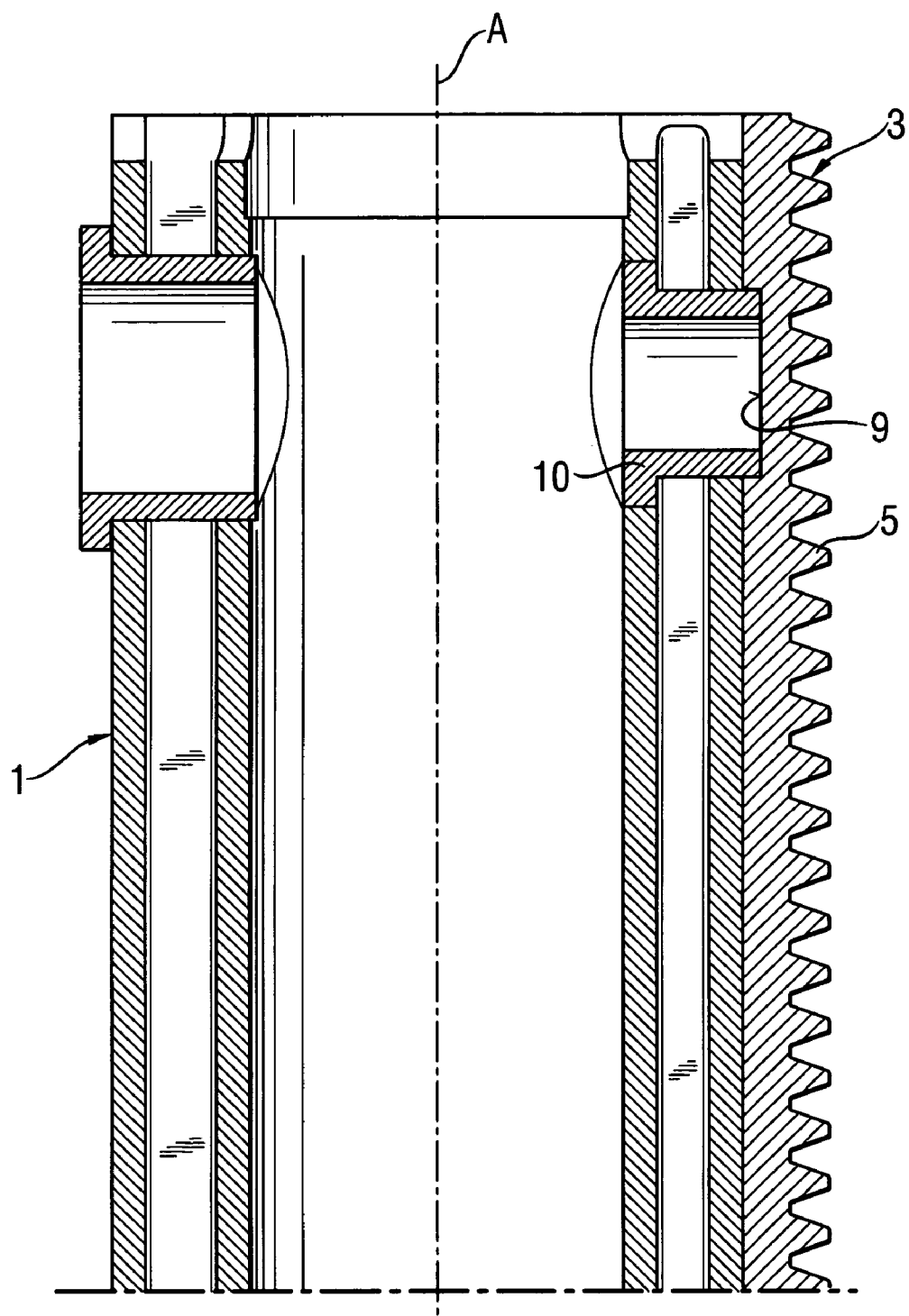

000# GUIDE SECTION WITH TOOTHED RACK

BACKGROUND OF THE INVENTION

The invention relates to a guide section for axial guidance of a slide for a power tool having an axial toothed rack for longitudinal feed.

This type of guide section with an axial toothed rack is used in particular for drilling rods and guide rails when working rock, for example for core drilling and stone saws. In order to be able to sustain the high flexural torsional moments that occur and at the same time to remain transportable at a length of up to several meters, the guide sections must be configured out of high-rigidity hollow sections of extruded aluminum or aluminum alloy.

According to DE 4326194 a toothed rack is configured in one piece with the guide section. By virtue of the lower strength relative to steel, an equivalently stressable rail had to be formed wider in the case of aluminum sections, whereby consequently wider toothed rack drives were required.

According to U.S. Pat. No. 5,549,390 a guide section of a guide rail for a drilling tool in configured of a highly rigid hollow section with a toothed rack of rectangular cross-section arranged in a rectangular receiving groove. According to DE 19749625 a guide section configured as a highly rigid hollow section made of extruded aluminum has a wedge-shaped, expanded receiving groove for a toothed rack. The toothed rack must be fastened by means of separate fastening members in the receiving groove. The fastening bore holes extending through the toothed rack weaken its strength, whereby breakage is more probable.

According to U.S. Pat. No. 5,845,996, a rack is fastened using several screws and nuts in an undercut fastening groove of a guide section formed of a highly rigid hollow aluminum section. Drilling of the toothed rack and the guide section and subsequent tightening is technologically costly and the number of required components is appreciably increased by the screws and nuts.

SUMMARY OF THE INVENTION

The primary object of the invention is to proved a technologically simple embodiment of a guide section formed of a highly rigid hollow shape with a separate toothed rack.

Essentially, a guide section for guiding a slide of a power tool along a longitudinal axis A with a separate axial toothed rack for the longitudinal advance of the slide has a toothed rack arranged in an external open receiving groove with an outwardly oriented arrangement of teeth, wherein the toothed rack in cross-section forms at least two opposing undercut sides, by means of which the edges of the receiving groove of the guide section are at least partially inserted.

By virtue of the two opposing sides laterally undercut relative to the teeth, the toothed rack can be permanently form—lockingly seamed in the sides in the plastically deformed material protruding into the open undercut of the guide section for the toothed rack. In particular, a plastic fluid material like aluminum is compressed over the undercut sides by means of two rollers moved along the toothed rack and thus beaded, which is technologically very simple.

Advantageously, the toothed rack has two laterally disposed longitudinal grooves, whereby the groove edges are formed by the inner remnant of the groove surface and the undercuts by means of the longitudinal grooves. In addition, such sides can be technologically simply manufactured of standardized toothed racks available in cut lengths with rectangular cross-section.

Advantageously, the longitudinal grooves are arranged completely outside of the toothing, whereby the toothing in a technologically simple manner lie directly adjacent to each other transverse to the longitudinal extent of several toothed racks for clamping insertion of the toothing.

Advantageously, the toothed rack has at least one axially limited recess lying opposite to the toothing, in which a connection bushing extending transverse to the longitudinal axis engages with a further guide section, wherein it is used for precise axial positioning of the toothed rack relative to the guide section and in addition can form lockingly absorb longitudinal forces.

BRIEF DESCRIPTION OF THE DRAWING

The invention will be more completely described with reference to an exemplary embodiment, wherein:

FIG. 3 represents a guide section in longitudinal section along the plane III—III of FIG. 1.

DETAILED DESCRIPTION OF THE INVENTION

Figure 1:
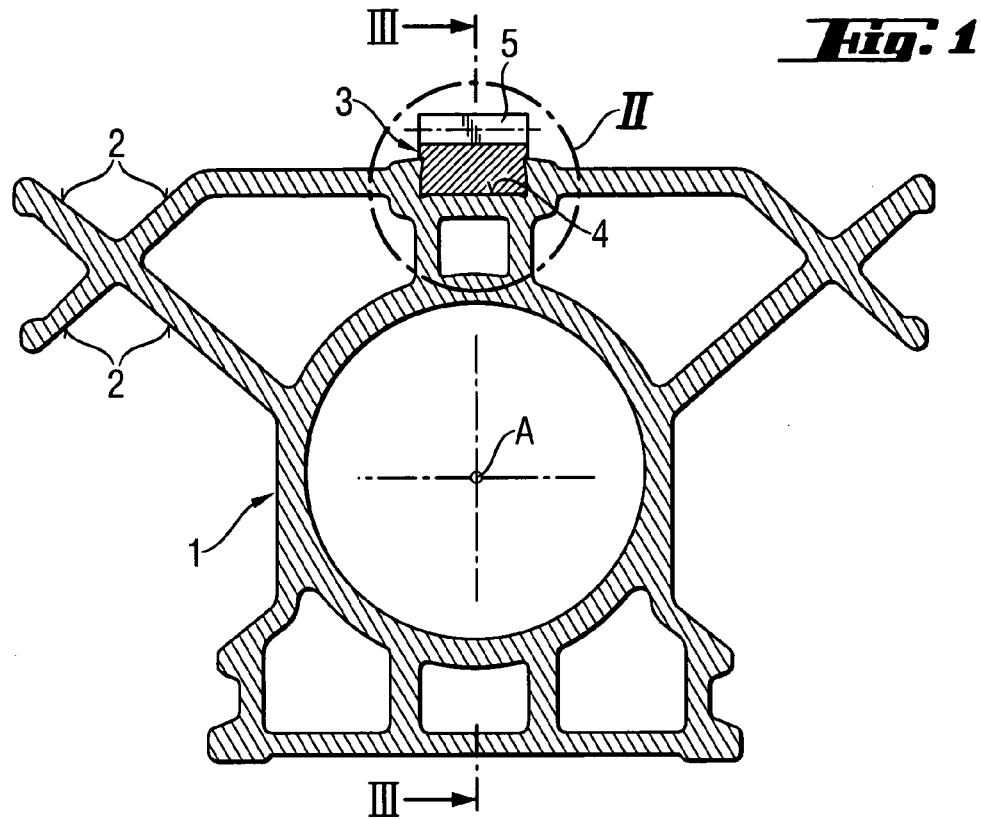
FIG. 1 represents a guide section in cross-section.

According to FIG. 1 a guide section 1 made of extruded aluminum with guide surfaces 2 for guiding a slide (not shown) of a power tool (not shown) along a longitudinal axis A of a separate axial toothed rack 3 made of steel, which is arranged in an outwardly open receiving groove 4. The toothed rack 3 has outwardly oriented toothing 5.

Figure 2:
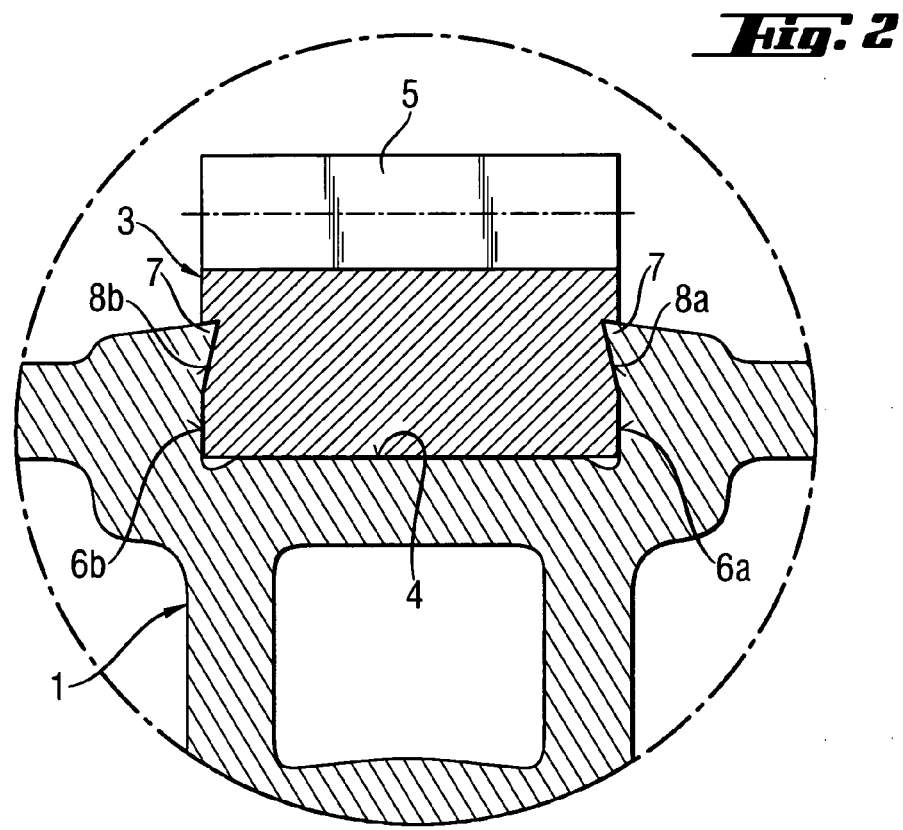
FIG. 2 represents an enlarged cut-out of zone II of FIG. 1.

According to FIG. 2, the toothed rack 3 in cross-section has two outwardly disposed undercut sides 6a, 6b relative to the toothing 5, over which groove edges 7 of the receiving groove 4 of the guide section 1 is inserted. The toothed rack 3 has two laterally opposing longitudinal undercut grooves 8a, 8b, which are arranged completely spaced from the toothing 5.

According to FIG. 3, the toothed rack 3 in longitudinal section has a groove 9 situated opposite to the toothing 5, in which a connecting bushing 10 extending transverse to the longitudinal axis A engages form lockingly for coupling to an adjoining guide section 1.

The invention claimed is:

1. An axially extending guide section (1) for axial guidance of a slide for a power tool comprises an axially extending toothed rack (3) for moving the slide, said guide section (1) having an axially extending receiving groove (4) facing outwardly, said toothed rack (3) secured in said receiving groove (4) and having toothing (5) facing outwardly from said receiving groove (4), said toothed rack (3) within said receiving groove (4) having axially extending opposite sides (6a, 6b) each being inwardly undercut with a groove edge (7) of said receiving groove (4) secured in said undercuts, wherein said toothed rack (3) has at least one recess (9) extending within and transversely of the axial direction of said toothed rack and said guide section (1) with a connection bushing (10) extending into said recess (9) for coupling to an adjoining said guide section.

2. An axially extending guide section, as set forth in claim 1, wherein said inwardly undercut is formed by two undercut axially extending grooves (8*a*, 8*b*) each arranged to receive one of said groove edges (7).

3. An axially extending guide section, as set forth in claim 2, wherein said undercut grooves (8*a*, 8*b*) are spaced inwardly from said toothing (5).

4. An axially extending guide section, as set forth in claim 1, wherein said guide section (1) is formed of extruded aluminum and said toothed rack (3) is formed of steel.

* * * * *